United States Patent
Katayama et al.

(10) Patent No.: US 10,054,689 B2
(45) Date of Patent: Aug. 21, 2018

(54) DOSE RATE MONITORING DEVICE

(71) Applicant: MITSUBISHI ELECTRIC CORPORATION, Chiyoda-ku, Tokyo (JP)

(72) Inventors: Shohei Katayama, Tokyo (JP); Kenichi Moteki, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/542,803

(22) PCT Filed: Apr. 28, 2015

(86) PCT No.: PCT/JP2015/062763
§ 371 (c)(1),
(2) Date: Jul. 11, 2017

(87) PCT Pub. No.: WO2016/174723
PCT Pub. Date: Nov. 3, 2016

(65) Prior Publication Data
US 2018/0011203 A1 Jan. 11, 2018

(51) Int. Cl.
*G01T 1/02* (2006.01)
*G01T 1/167* (2006.01)

(52) U.S. Cl.
CPC .............. *G01T 1/023* (2013.01); *G01T 1/167* (2013.01)

(58) Field of Classification Search
CPC ................................. G01T 1/023; G01T 1/167
See application file for complete search history.

(56) References Cited

U.S. PATENT DOCUMENTS 4,488,046 A * 12/1984 Bernstein .............. G01T 1/2004
250/474.1
5,933,473 A * 8/1999 Kitaguchi ............ G01N 23/043
378/149

(Continued)

FOREIGN PATENT DOCUMENTS

JP 11-160437 A 6/1999
JP 2000-065937 A 3/2000

(Continued)

OTHER PUBLICATIONS

International Search Report (PCT/ISA/210) dated Jun. 30, 2015, by the Japanese Patent Office as the International Searching Authority for International Application No. PCT/JP2015/062763.

(Continued)

*Primary Examiner* — Hugh H Maupin
(74) *Attorney, Agent, or Firm* — Buchanan Ingersoll & Rooney PC

(57) ABSTRACT

A dose rate monitoring device contains a first radiation detector including an inorganic crystal scintillator, a second radiation detector including a plastic scintillator, a detector mount having a cylinder part, a low range calculator calculating a first compensation dose rate of an incident radioactive ray based on the detection signal pulse, a high range calculator calculating a second compensation dose rate of an incident radioactive ray based on the detection signal pulse, a dose rate calculator calculating a dose rate ratio from the first compensation dose rate and the second compensation dose rate, and choosing a compensation dose rate according to the magnitude of the calculated dose rate ratio; and a display displaying the compensation dose rate which is outputted from the dose rate calculator, wherein the plastic scintillator which is included in the second radiation detector is wound around the cylinder part of the detector mount.

7 Claims, 9 Drawing Sheets

(56) References Cited

U.S. PATENT DOCUMENTS

| | | | |
|---|---|---|---|
| 6,326,623 B1 | 12/2001 | Chiba et al. | |
| 2011/0035151 A1* | 2/2011 | Botto | ........................ G01V 5/04 |
| | | | 702/2 |

FOREIGN PATENT DOCUMENTS

| | | |
|---|---|---|
| JP | 2000-275347 A | 10/2000 |
| JP | 2002-022839 A | 1/2002 |
| JP | 2002-168957 A | 6/2002 |
| JP | 2013-195320 A | 9/2013 |

OTHER PUBLICATIONS

Written Opinion (PCT/ISA/237) dated Jun. 30, 2015, by the Japanese Patent Office as the International Searching Authority for International Application No. PCT/JP2015/062763.

* cited by examiner

Low Range Compensation Coefficient Table

| Moving Average Wave Height h1 | Energy Compensation Coefficient $\beta 1$ | |
|---|---|---|
| h1(-j) | $\beta 1(-j)$ | |
| h1(-j+1) | $\beta 1(-j+1)$ | |
| . | . | |
| . | . | |
| h1(0)=h1$_s$ | $\beta 1(0)=\beta 1_s=1$ | Cs-137 base |
| . | . | |
| . | . | |
| h1(i-1) | $\beta 1(i-1)$ | |
| h1(i) | $\beta 1(i)$ | |

FIG. 7

High Range Compensation Coefficient Table

| Moving Average Wave Height h2 | Energy Compensation Coefficient $\beta 2$ | |
|---|---|---|
| $h2(-j)$ | $\beta 2(-j)$ | |
| $h2(-j+1)$ | $\beta 2(-j+1)$ | |
| . . | . . | |
| $h2(0)=h2_o$ | $\beta 2(0)=\beta 2_o=1$ | Cs-137 base |
| . . | . . | |
| $h2(i-1)$ | $\beta 2(i-1)$ | |
| $h2(i)$ | $\beta 2(i)$ | |

DOSE RATE MONITORING DEVICE

FIELD OF THE INVENTION

The present invention relates to a dose rate monitoring device, and more particularly, relates to a dose rate monitoring device which can be applied to a wide range of dose rates.

BACKGROUND OF THE INVENTION

In order to measure a wide range of dose rates which range from a natural radiation level at ordinary times to a high radiation level at the time of an accident, two dose rate monitoring devices (or a radiation monitoring apparatus) are installed in and around a nuclear reactor facility, a spent fuel reprocessing plant and the like (for example, Patent Documents 1-6). Each of the dose rate monitoring devices is equipped with a radiation detector of a different kind. Contrary to the intention to share the measurement range for measuring dose rates at the same measurement point, arranging detecting devices side by side enlarges the size of a whole apparatus, and moreover, poses an obstacle to the incidence of space radioactive rays, and makes an impact on the accuracy of the measurement.

It is eagerly anticipated to provide a dose rate monitoring device which can be applied to a wide range of dose rates in a single body, also from the viewpoint of cost reduction and space saving. As a measure for solving this subject, proposed is a radiation monitoring apparatus (or a dose rate monitoring device) which includes a single detection part on which a low range detector and a high range detector are arranged. The low range detector employs a scintillation detector and the high range detector employs a semiconductor detector. The radiation monitoring apparatus switches the range in measurement depending on the magnitude of a dose rate and outputs the dose rate.

When switching between a low range and a high range is performed for outputting a dose rate, a difference in level will be produced in the measured values, due to the difference in energy characteristics of the radiation detectors. In order to reduce the difference in level, the radiation monitoring apparatus according to Patent Document 1 measures a wave height spectrum in the output pulse from at least one of the detectors, and estimates the energy of an incident radioactive ray. The radiation monitoring apparatus is configured to cancel a big difference in level which is produced at a switching point of the measurement ranges, by uniting this estimated value with one of the energy characteristics with respect to the upper and lower dose rate domains which include the switching point.

In the radiation monitoring apparatus according to Patent Document 2, three scintillation detectors are arranged; with one detector on the head face of the cylindrical scintillator of a scintillation detector and the other two detectors on the side faces of the cylindrical scintillator, each detector with a 180 degree separation. By making efforts in the arrangement of radiation detectors, the radiation monitoring apparatus is configured to reduce differences in level which are to be produced at the time of range switching due to the directional dependencies (differences in sensitivity due to the incident direction of a radioactive ray) of a low range detector and a high range detector. In both Patent Documents, a NaI (Tl) scintillation detector, for example, which employs a thallium activated sodium iodide scintillator, is used as a scintillation detector.

CITATION LIST

Patent Literature

[Patent Document 1] JP 2002-22839 A
[Patent Document 2] JP 2002-168957 A
[Patent Document 3] JP 2000-275347 A
[Patent Document 4] JP H11-160437 A
[Patent Document 5] JP 2000-65937 A
[Patent Document 6] JP 2013-195320 A

SUMMARY OF THE INVENTION

Technical Problem

According to the dose rate monitoring device in relation to Patent Document 1, even though the generation of differences in level at the switching point can be reduced, the linearity and the energy characteristic over the whole range, where both of the low range dose rate and the high range dose rate are combined, are not improved. It is to be noted that according to the dose rate monitoring device in relation to Patent Document 2, the whole semiconductor detectors get into the shadow with respect to the radiation sensor (scintillator) of a scintillation detector and then pose an obstacle to the measurement.

The present invention has been implemented in order to solve the foregoing subjects; the objective thereof is to make flat both the energy characteristics of a low range dose rate and a high range dose rate, consequently to improve the linearity and the energy characteristic over the whole range, and to provide a dose rate monitoring device which is capable of performing wide range and highly precise measurements.

Solution to Problem

A dose rate monitoring device according to the present invention; contains a first radiation detector, including an inorganic crystal scintillator and outputting a detection signal pulse when a radioactive ray enters, a second radiation detector, including a plastic scintillator and outputting a detection signal pulse when a radioactive ray enters, a detector mount, having a cylinder part and accommodating the first radiation detector and the second radiation detector, a low range operation part, calculating a first compensation dose rate of an incident radioactive ray, using an energy compensation coefficient and a G (E) function table, based on the detection signal pulse which is outputted from the first radiation detector, a high range operation part, calculating a second compensation dose rate of an incident radioactive ray, using an energy compensation coefficient, based on the detection signal pulse which is outputted from the second radiation detector, a dose rate switching part, calculating a dose rate ratio (the second compensation dose rate/the first compensation dose rate) from the first compensation dose rate which is calculated in the low range operation part and the second compensation dose rate which is calculated in the high range operation part, and choosing a compensation dose rate, which is to be outputted therefrom, according to the magnitude of the calculated dose rate ratio; and a display and operation part, displaying the compensation dose rate which is outputted in the dose rate switching part, wherein the plastic scintillator which is included in the second radiation detector is wound around the cylinder part of the detector mount.

Advantageous Effects of Invention

According to the dose rate monitoring device of the present invention, energy characteristics can be made flat in both of the low range dose rate and the high range dose rate, the linearity and energy characteristics can be improved over the whole range as a result, and the dose rate monitoring device which is capable of performing wide range and highly precise measurements can be offered.

BRIEF DESCRIPTION OF THE DRAWINGS

FIG. 7 is a drawing for showing a compensation coefficient table of the high range dose rate.

DESCRIPTION OF EMBODIMENTS

Figure 1:
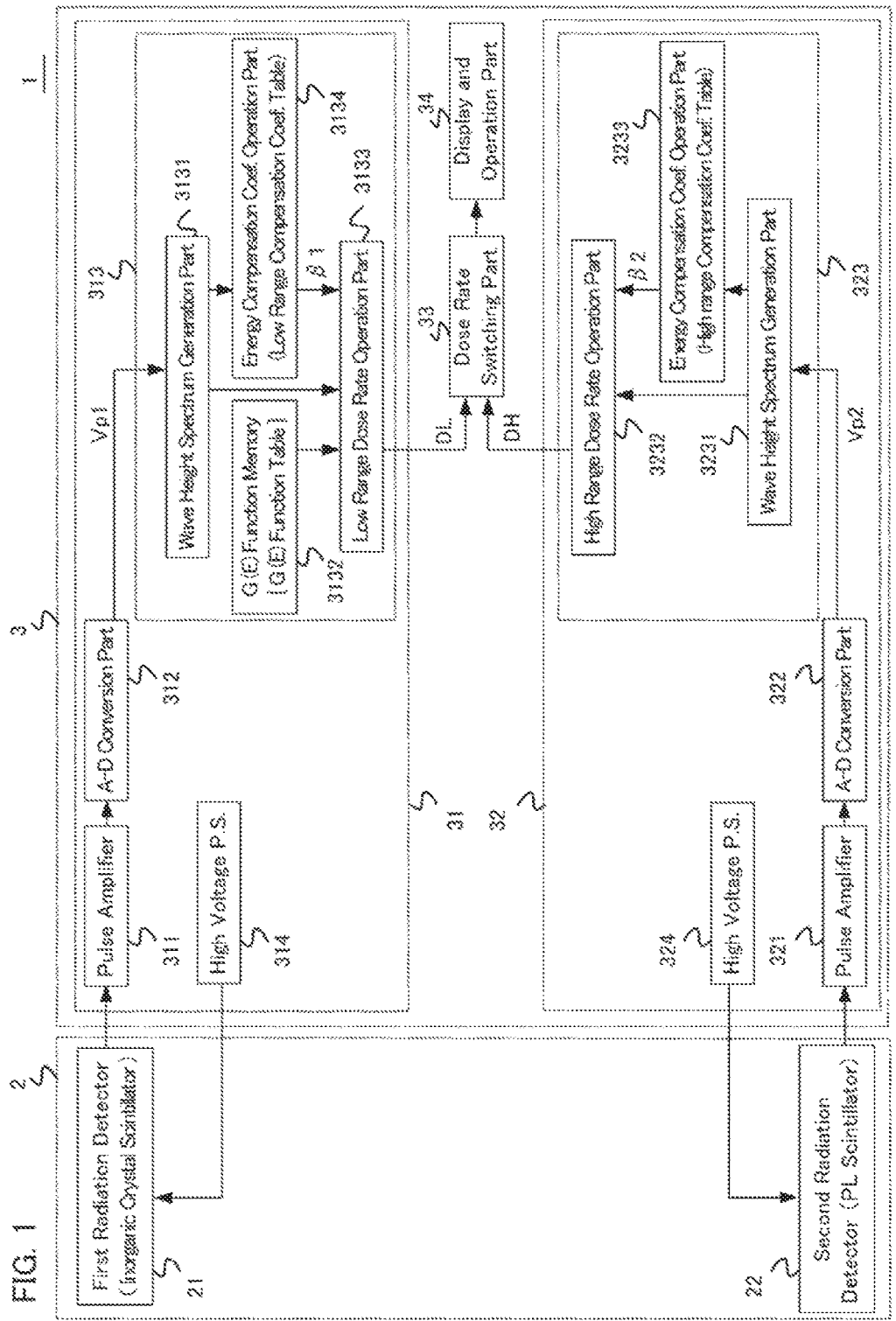
FIG. 1 is a drawing for showing the configuration of a dose rate monitoring device in accordance with Embodiment 1.

Hereinafter, a dose rate monitoring device according to the embodiments of the present invention will be described with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may different among sectional views in which a part of the configuration is changed. Furthermore, although the configurations of the dose rate monitoring device are further actually provided with a plurality of members, for ease of explanation, only portions necessary for explanation will be described and other portions are omitted.

Embodiment 1.

Hereinafter, a dose rate monitoring device in accordance with Embodiments of the present invention will be explained with reference to FIGS. 1-13. FIG. 1 is a schematic for showing the configuration of a dose rate monitoring device in accordance with Embodiment 1. As shown in the drawing, the dose rate monitoring device 1 is equipped with a detecting part 2 and a measurement part 3. The detecting part 2 consists of a first radiation detector 21 which is in charge of a sphere for low range dose rates, and a second radiation detector 22 which is in charge of a sphere for high range dose rates. The sphere for high range dose rates succeeds to the sphere for low range dose rates. In the low range dose rate, the first radiation detector 21 outputs a discrete detection signal pulse (a first detection signal pulse) which has a wave height proportional to the energy of an absorbed radioactive ray. In the high range dose rate, the second radiation detector 22 outputs a discrete detection signal pulse (a second detection signal pulse) which has a wave height proportional to the energy of an absorbed radioactive ray.

Figure 2:
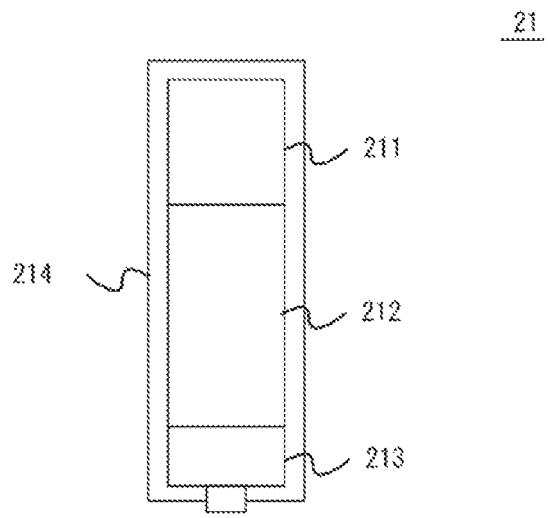
FIG. 2 is a drawing for showing the configuration of a first radiation detector in accordance with Embodiment 1.

The configuration of the first radiation detector 21 is explained based on FIG. 2. As shown in the drawing, the first radiation detector 21 is equipped with an inorganic crystal scintillator 211, a photo-multiplier 212, a preamplifier 213, and a detector case 214. The inorganic crystal scintillator 211 of a cylindrical shape emits fluorescence on the incidence of a radioactive ray. The photo-multiplier 212 is optically connected with the inorganic crystal scintillator 211 of the cylindrical shape and takes in the fluorescence. The fluorescence is changed into a current pulse and then amplified in magnitude in the photo-multiplier 212. The preamplifier 213 transforms a current pulse, which is produced in the photo-multiplier 212, into a voltage pulse and outputs it. The detector case 214 contains three components (an inorganic crystal scintillator 211, a photo-multiplier 212, and a preamplifier 213) inside thereof and blocks out light, and further shields electrically.

Figure 3:
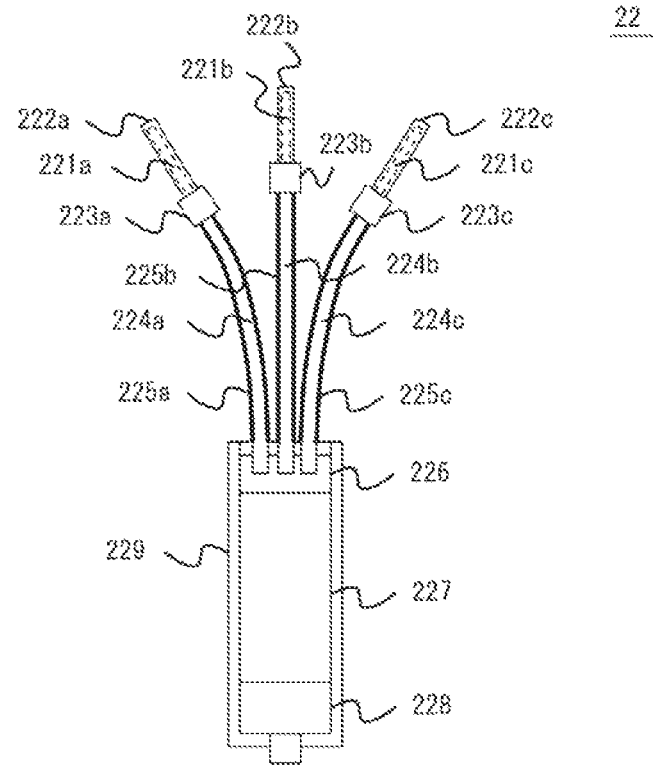
FIG. 3 is a drawing for showing the configuration of a second radiation detector in accordance with Embodiment 1.

The configuration of the second radiation detector 22 is explained based on FIG. 3. As shown in the drawing, the second radiation detector 22 is equipped with a PL scintillation fiber 221 (or a plastic scintillator), a filter 222, an optical coupler 223, an optical fiber 224, a shading tube 225, a light guide 226, a photo-multiplier 227, a preamplifier 228, and a detector case 229. The PL scintillation fibers 221a, 221b, and 221c emit fluorescence on the incidence of a radioactive ray. The filters 222a, 222b, and 222c cover a respective PL scintillation fiber, and reduce the energy of incident radioactive rays. The filters 222a, 222b, and 222c make flat the counting rate response in the measurement part 3 as a whole, and in addition, block out light. The optical couplers 223a, 223b, and 223c make respective optical junctions between the optical fibers 224 and the PL scintillation fibers 221 a-c.

The optical fibers 224a, 224b, and 224c transmit fluorescence respectively produced in the PL scintillation fibers 221 a-c to the light guide 226. The shading tubes 225a, 225b, and 225c block out the light to the optical couplers 223 and the optical fibers 224. The light guide 226 collects fluorescence transmitted through the optical fibers 224. The photo-multiplier 227 takes in the collected fluorescence, and changes it to a current pulse and amplifies the pulse in magnitude. The preamplifier 228 transforms the current pulse into a voltage pulse, and outputs it. The detector case 229 contains the light guide 226, the photo-multiplier 227, and the preamplifier 228 inside thereof and blocks out light, and in addition shields those elements electrically. It is to be noted that although the filters 222a, 222b, and 222c can employ a metal pipe with a thickness of 2 mm or so which has a closed end and is light shielded, a pipe made of rubber material containing metal powders also may be employed. Calculations in the reduction of radioactive rays and irradiation type tests will be performed to determine the thickness of the filter 222.

Figure 4:
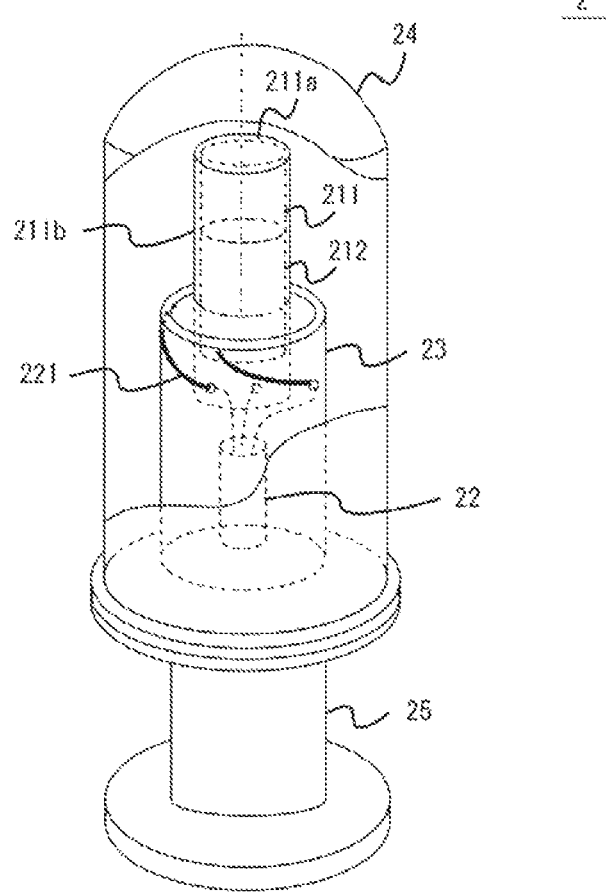
FIG. 4 is a perspective diagram for showing the configuration of a detecting part in accordance with Embodiment 1.

FIG. 4 shows the whole configuration of a detecting part 2. A detector mount 23 contains a first radiation detector and a second radiation detector inside thereof. As shown in the drawing, the inorganic crystal scintillator 211 of the first radiation detector is arranged in the center of the detecting part 2, with one side end face (a upper face 211a) turning straight up. The photo-multiplier 212 is optically connected to the opposite side end face (a bottom face 211b) of the inorganic crystal scintillator 211. The first radiation detector 21 is supported with the detector mount 23. The detector mount 23 is arranged in a position which does not pose an obstacle to the measurement space of the inorganic crystal scintillator 211 (or the first radiation detector 21). The detecting part overcoat 24 contains the first radiation detector 21, the second radiation detector 22, and the detector mount 23 inside thereof, and shields them electrically. The detecting part overcoat 24 needs to be kept away from the open air and have waterproofing structure, when the detecting part 2 is installed outside. The stand 25 supports the detecting part overcoat 24 and elements included in the overcoat, and in addition, holds the first radiation detector 21 at a determined height. It is to be noted that although only two PL scintillation fibers 221 are depicted in the drawing, another PL scintillation fiber 221 is arranged at the back side of the detector mount 23. Each of the PL scintillation fibers 221 is wound around the cylinder part of the detector mount 23. As for the number of winding around, the PL scintillation fiber is allowed to make a full circuit around the cylinder part, although a fiber like PL scintillation fiber has made ⅓ circuit around the cylinder part here.

Figures 5, 6:
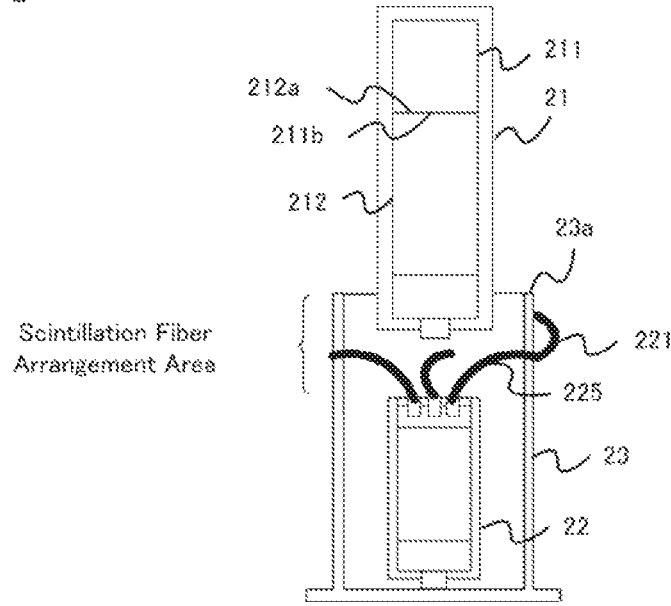
FIG. 5 is a sectional view for showing the principal part of the detecting part in accordance with Embodiment 1.
FIG. 6 is a drawing for showing a compensation coefficient table of the low range dose rate.

FIG. 5 is a sectional view for showing the principal part of the detecting part 2. On the outside of the first radiation detector 21, the detector mount 23 has a cylinder part 23a, which shares the central axis of the detectors (the first radiation detector 21 and the second radiation detector 22). The second radiation detector 22 is accommodated in the cylinder part 23a of the detector mount 23. The PL scintillation fibers 221a-221c are arranged in a scintillation fiber installation area of the detector mount 23, and furthermore along the outer circumference of the cylinder part 23a. On the outside surface of the cylinder part 23a of the detector mount 23, three PL scintillation fibers 221, which constitute the second radiation detector 22, are attached aslant, so that the PL scintillation fibers 221 may not overlap mutually, when viewed directly overhead from the central axial direction of the detector. The PL scintillation fibers 221a, 221b, and 221c are arranged so that the total area of the each fiber viewed from directly overhead and the total area of the each fiber viewed from edge-on may become almost equal.

The detector mount 23 includes a front edge, which does not protrude from the fluorescence entrance plane 212a of the photo-multiplier 212, towards the direction of the inorganic crystal scintillator 211. In addition, the PL scintillation fiber 221 retreats behind the bottom face 211b of the inorganic crystal scintillator 211, towards its back side direction (towards the direction of the PL scintillation fiber 221 from the photo-multiplier 212). The second radiation detector is arranged around the central axis of the first radiation detector, so that the second radiation detector may not be laid on the shadow of the measurement area of the first radiation detector and further share the measurement area with the first radiation detector. It is to be noted that the second radiation detector is arranged so as to become not only symmetry but also equi-angularly to the central axis. Accordingly, the sensitivity of the second radiation detector at the time when radioactive rays are irradiated from the central axis direction of the first radiation detector can be equivalent to the sensitivity at the time when radioactive rays are irradiated from a direction which has a right angle to the central axis of the first radiation detector. Preferred directional characteristics for the PL scintillation fibers 221 will be acquired, by conducting an irradiation experiment as a type test, tuning finely the aslant arrangement angle of a PL scintillation fiber, and determining a standard arrangement.

The first radiation detector 21 and the second radiation detector 22 share the dose rate range, so that measurements are not affected by the probability that a pulse comes to near another pulse and overlaps each other, in each pulse train of the detection signal. The first radiation detector 21 and the second radiation detector 22 overlap in part each other in their charge domains and a required wide range is realized as a total. Difference in the detection efficiency is led by an employment of an inorganic crystal scintillator 211 to the first radiation detector 21 and an employment of PL scintillation fibers 221a, 221b, and 221c to scintillators of the second radiation detector 22. In addition, a big difference in detection efficiency can be realized by changing a diameter and length of a scintillator depending on its kind.

Although a cylindrical NaI (Tl) scintillator, which is easily available at a low price, is used as an inorganic crystal scintillator here, a BGO ($Bi_4Ge_3O_1$) scintillator, a CsI (Tl) scintillator and the like can be also applied to the inorganic crystal scintillator, and further as for the shape of a scintillator, a scintillator of a spherical shape can be also applied to. The second radiation detector 22 includes three PL scintillation fibers here. It is to be noted that a single fiber is allowed to be employed, as long as it fulfills range assignment nature, directional characteristics, and required flexibility. Furthermore, a second radiation detector may be constituted from two fibers or four and above fibers.

As for the first radiation detector 21, the linearity in the measurement range decreases at higher dose rates, owing to the fact that the probability in the occurrence of the pileup of first detection signal pulses cannot be disregarded. When dose rates become high, the second radiation detector 22 also will decrease in linearity similarly. The diameter and length of a first radiation detector 21 are determined so that the first radiation detector 21 may secure a required lower limit range and overlaps moderately with the range of the second radiation detector 22 at a highermost range, and furthermore, also taking into account the easy availability of the detector. The diameter and dimension of the second radiation detector 22 are determined so that the PL scintillation fibers 221a-221c of the second radiation detector 22 can cover a upper most range within the limit of measurement accuracy, and further the lower limit range may become below the upper most range of the first radiation detector 21 and overlap partly with the upper most range.

The first radiation detector 21 and the second radiation detector 22 are, for example, 5 digits or so different in detection efficiency (the counting rate per unit dose rate at the same energy). If the detection efficiency of the PL scintillation fibers 221a, 221b, and 221c is too low, the resolution of the dose rate near the lower limit range at the high range which the PL scintillation fibers are in charge of will be lowered. Accordingly, fluctuations of the dose rate suddenly increase to a large extent at the time when the range is switched from the low range dose rate to the high range dose rate. The diameter and length of a PL scintillation fiber are determined, taking into account such circumstances. It is to be noted that the total range of a dose rate monitoring device will extend from the lower limit range of the first radiation detector 21 to the upper most range of the second radiation detector 22.

Next, the role of a measurement part 3 will be explained with reference to FIG. 1. A low range dose rate measurement part 31 (a first dose rate measurement means, a first energy compensation coefficient operation means) receives a first detection signal pulse from the first radiation detector 21; measures a first wave height spectrum of the first detection signal pulse; performs weighted calculation on each wave height of the first wave height spectra by the dose rate per unit counting rate (nGy*h$^{-1}$/cpm); multiplies the dose rate by a counted number corresponding to each wave height; integrates the resultant values over a measurement energy range, and obtains a pre energy compensation low range dose rate D1 (a first dose rate), by carrying out a moving average over a measuring time. Furthermore, the low range dose rate measurement part 31 outputs a low range compensation dose rate DL (a first compensation dose rate), which is obtained by energy compensating the pre energy compensation low range dose rate D1 with an energy compensation coefficient β1 (a first energy compensation coefficient).

A high range dose rate measurement part 32 (a second dose rate measurement means, a second energy compensation coefficient operation means), receives a second detection signal pulse from the second radiation detector 22; measures a second wave height spectrum of the second detection signal pulse; integrates a counted number corresponding to each wave height of the second wave height spectrum over a measurement energy range, and finds a counting rate by carrying out a moving average over measuring time. Furthermore, the high range dose rate measurement part 32 multiplies a conversion constant (nGy*h$^{-1}$/cpm) by the counting rate; obtains a pre energy compensation high range dose rate D2 (a second dose rate), and then outputs a high range compensation dose rate DH (a second compensation dose rate), which is obtained by energy compensating the pre energy compensation high range dose rate D2 with a energy compensation coefficient β2 (a second energy compensation coefficient).

It is to be noted that an amount of luminescence per unit time by radioactive rays and a dose rate (nGy/h) have correlation, when each PL scintillation fiber in the second radiation detector 22 is equipped with no physical filters. For every operation cycle, each wave height of the second wave height spectrum is multiplied by a counted number of the wave height concerned, and resultant values are integrated over a measurement energy range. When a dose rate is calculated based on the cumulated wave height per unit time (equivalent to the amount of luminescence per unit time), which is obtained by carrying out move averaging on the integrated value divided by a constant periodic time over a measuring time, the dose rate will have good energy characteristics.

Counting rates become exponentially large as energy approaches a lower level, and an upper limit of the range decreases as a result, and the counting rates will become unsatisfactory in the upper limit of the range. In order to solve this point, a physical filter is disposed in each of the PL scintillation fibers, and radioactive rays which enter into the PL scintillation fiber are reduced in magnitude. Instead of arranging a physical filter in each of the PL scintillation fibers, a filter which contains all the PL scintillation fibers inside is allowed to be installed.

In the PL scintillation fibers of the second radiation detector 22, the relation of the amount of luminescence per unit time to the energy of a radioactive ray (photon) has a good energy feature at 100 keV or more, and shows a decrease with the fall of energy at the energy no more than 100 keV. The amount of luminescence per unit time falls to around ½ at 50 keV. It is to be noted that the energy characteristics of the amount of luminescence has the small dependence on a diameter in 50 keV or more. Therefore, as for the PL scintillation fiber, energy characteristics are made flat on the whole with a filter, and the remained distortion in the energy characteristics is energy compensated by the energy compensation coefficient β2. Accordingly, the characteristic at low energy is especially improved and good energy characteristics are obtained in the whole area of the measurement energy.

A dose rate switching part 33 (a dose rate change means) switches the measurement range from a low range compensation dose rate DL to a high range compensation dose rate DH, at a set upped switching point of the rise time, when dose rates are on a rise tide. When dose rates are on an ebb tide, the dose rate switching part switches the measurement range from a high range compensation dose rate DH to a low range compensation dose rate DL, at a set upped switching point of the descent time. In order to prevent hunching at the time of switching, hysteresis is prepared, where switching point of the rise time > switching point of descent time is satisfied. A display and operation part 34 displays a compensation dose rate (the high range compensation dose rate DH or the low range compensation dose rate DL) outputted from the dose rate switching part 33, and in addition performs setting up of a measurement part by a touch panel.

Next, the detailed configuration and operation of a low range dose rate measurement part 31 and a high range dose rate measurement part 32 are explained. The low range dose rate measurement part 31 includes a pulse amplifier 311, a A-D conversion part 312 (Analog to Digital conversion part), a low range operation part 313, and a high voltage power supply 314. The pulse amplifier 311 receives a first detection signal pulse outputted from the first radiation detector 21 and amplifies it, and in addition, removes superimposed high frequency noises. The A-D conversion part 312 measures the wave height of the first detection signal pulse amplified with the pulse amplifier 311, and outputs the wave height Vp1. The high voltage power supply 314 supplies high voltage in order to operate the first radiation detector 21 (scintillation detector). The low range operation part 313 is equipped with a wave height spectrum generation part 3131, a G (E) function memory 3132, a low range dose rate operation part 3133, and an energy compensation coefficient operation part 3134 (a first energy compensation coefficient operation means).

In the low range operation part 313, a wave height spectrum generation part 3131 receives a wave height Vp1 outputted from the A-D conversion part 312, generates a first wave height spectrum and outputs it. A G (E) function memory 3132 keeps a G (E) function table in remembrance, on which each ch (i), equivalent to a wave height, is arrayed with the corresponding dose rate Gi (nGy*h$^{-1}$/cpm). Here, for example, the measurement energy range of 50-3000 keV is divided into 10-600 channels (ch). A low range dose rate operation part 3133 receives spectrum data from the wave height spectrum generation part 3131, and at each operation cycle, using this G (E) function table, obtains the product of a dose rate Gi and a counted number Ni, in each ch (i) of 10-600 chs for a constant cycle. The integrated product of $\Sigma Gi \times Ni$ is divided by a constant periodic time to make a dose rate of the operation cycle time concerned. When the data row which includes up dated dose rates for a measuring time are move averaged, a pre energy compensation low range dose rate D1 will be found.

An energy compensation coefficient operation part 3134 receives spectrum data from the wave height spectrum generation part 3131, and obtains a product of a wave height Hi and a counted number Ni at each ch (i) of 10-600 chs which were measured at a constant cycle. The integrated wave height $\Sigma Hi \times Ni$ is divided by an integrated counted number $\Sigma Ni$ to make an average wave height of the operation cycle time concerned. An average wave height data row includes an updated average wave height for the measuring time. When the average wave height data rows are move averaged to make a moving average wave height h1. The moving average wave height h1 is in correlation with the representation energy of radioactive rays which enter into the first radiation detector 21. It is to be noted that the dose rate which is obtained based on the G (E) function, on the assumption that all of the counted numbers within the measurement energy range are representative of energy, has a relationship that it is equal to the dose rate which is obtained based on the spectrum and the G (E) function as mentioned above.

FIG. 6 shows a low range compensation coefficient table (a first compensation coefficient table), on which the moving average wave height h1 and the energy compensation coefficient β1 are arranged in correlation each other. The energy compensation coefficient operation part 3134 keeps this low range compensation coefficient table (β1) in remembrance, collates a moving average wave height h1 with the low range compensation coefficient table, determines the energy compensation coefficient β1 and outputs it. The low range dose rate operation part 3133 outputs a low range compensation dose rate DL, which is obtained by multiplying an energy compensation coefficient β1 by a pre energy compensation low range dose rate DE It is to be noted that in the compensation coefficient table (β1), for example, the standard energy is set on a γ ray 662 keV of Cs-137, the corresponding energy compensation coefficient β1 is set to 1, and energy compensation coefficients β1 of other energies are shown as the ratio of the standard energy.

The high range dose rate measurement part 32 includes a pulse amplifier 321, an A-D conversion part 322 (an Analog to Digital conversion part), and a high range operation part 323. The pulse amplifier 321 receives a second detection signal pulse outputted from the second radiation detector 22, amplifies it, and further removes high frequency noises which are superimposed on the detection signal pulse. The A-D conversion part 322 measures a wave height of the second detection signal pulse amplified with the pulse amplifier 321, and outputs the wave height Vp2. The high voltage power supply 324 supplies high voltage in order to operate the second radiation detector 22. The high range operation part 323 is equipped with a wave height spectrum generation part 3231, a high range dose rate operation part 3232, and an energy compensation coefficient operation part 3233 (a second energy compensation coefficient operation means).

In the high range operation part 323, the wave height spectrum generation part 3231 receives a wave height Vp2 outputted from the A-D conversion part 322, and generates a second wave height spectrum and outputs it. The high range dose rate operation part 3232 receives spectrum data from the wave height spectrum generation part 3231, integrates a counted number Mi of each ch (i) over 10-600 chs measured at a constant cycle, divides the integrated counted number $\Sigma Mi$ by a constant periodic time, and obtains a counting rate of the operation cycle time concerned. When the data row which includes updated counting rates for the measuring time is move averaged, a moving average counting rate will be obtained. This moving average counting rate is multiplied by a proofreading constant, and a pre energy compensation high range dose rate D2 is obtained.

The energy compensation coefficient operation part 3233 receives spectrum data from the wave height spectrum generation part 3231, and obtains a product of a wave height Hi and a counted number Mi in each ch (i) of 10-600 chs which were measured at a constant cycle to calculate an integrated wave height. The integrated wave height $\Sigma Hi \times Mi$ is divided by an integrated counted number E Mi to make an average wave height of the operation cycle time concerned. An average wave height data row includes updated average wave heights for the measuring time. A moving average wave height h2 is obtained by carrying out the moving average of the average wave height data rows. The moving average wave height h2 is in correlation with the dominant energy of dose rates in the measuring time concerned, and the dominant energy also goes up with the rise of the moving average wave height h2.

FIG. 7 shows a high range compensation coefficient table (a second compensation coefficient table), on which a moving average wave height h2 and an energy compensation coefficient β2 (a second energy compensation coefficient) are arranged in correlation each other. The energy compensation coefficient operation part 3233 keeps this high range compensation coefficient table (β2) in remembrance, collates a moving average wave height h2 with a high range compensation coefficient table, determines the energy compensation coefficient β2 and outputs it. The high range dose rate operation part 3232 outputs a high range compensation dose rate DH (a second compensation dose rate), which is obtained by multiplying a pre energy compensation high range dose rate D2 by an energy compensation coefficient β2. It is to be noted that in the high range compensation coefficient table, the standard energy is set, for example, on γ ray 662 keV of Cs-137, the corresponding energy compensation coefficient β2 is set to 1, and energy compensation coefficients β2 of other energies are shown by the ratio with the standard energy. The high range compensation coefficient table is created in a way like the low range compensation coefficient table is created.

Figure 8:
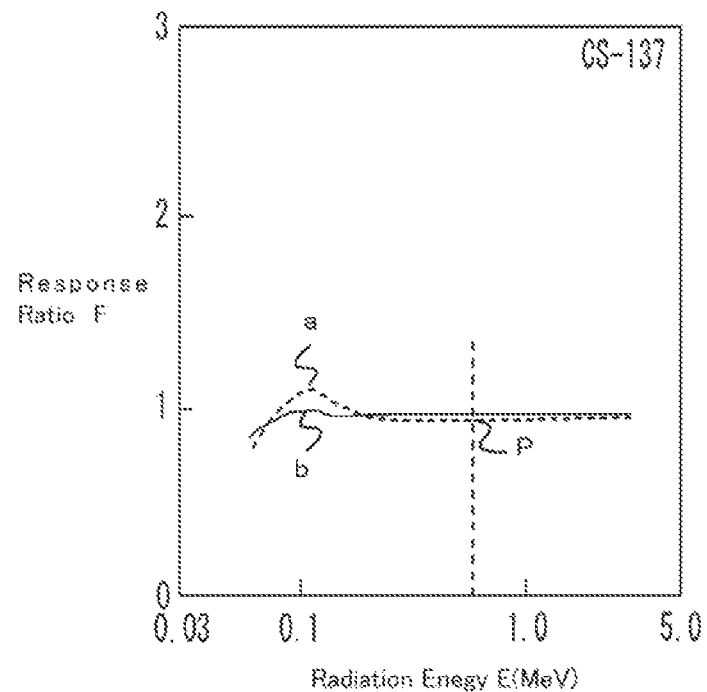
FIG. 8 is a drawing for showing an energy characteristic of the low range dose rate.

FIG. 8 illustrates the energy characteristics of a low range dose rate, which present before and after the energy compensation. Energy Characteristic a shows the one for the pre energy compensation low range dose rate D1, in a case where a NaI (Tl) scintillator is employed as the cylindrical inorganic crystal scintillator 211 of the first radiation detector 21. Energy Characteristic b shows the one for the low range compensation dose rate DL, which is the result of multiplication of a pre energy compensation low range dose rate D1 by an energy compensation coefficient β1. Both Energy Characteristics show energy characteristics denoted by the ratio of the response of other energies, on the assumption that the response of the pre energy compensation low range dose rate D1 is set to 1, when a γ ray of Cs (Cesium)-137 with 662 keV energy enters on the scintillator.

The horizontal axis indicates the input energy E (MeV) of a radioactive ray, and the vertical axis indicates the response ratio F of the dose rate monitoring device 1, where the reference point P is set to have a standard value 1. Because the pre energy compensation low range dose rate D1 is determined by finely collating a wave height spectrum with a dose rate in use of the G (E) function, good energy characteristics are obtained fundamentally in Energy Characteristic a. Detector signal pulses of less than 50 keV are regarded as noises and then discarded in the A-D conversion part 312, without measuring those pulses, in order to remove the influence of noises. The wave height spectrum is distributed partly below the peak wave height which is equivalent to the energy of the incident radioactive ray, even if the energy of a radioactive ray which enters into the first radiation detector 21 is within a measurement energy range. The rate of noises discarded increases as the energy of the incident radioactive ray approaches the lower limit energy of 50 keV. Accordingly, the influence of discarding cannot be ignored in the pre energy compensation low range dose rate D1.

The amount of luminescence per unit energy, which is given by a radioactive ray, presents a mountain shape with a maximum peak of 1.2 or so, in the case where the incident radioactive ray is 400 keV or less. When the influence of pulse discarding of 50 keV or less and the influence of the increased amount of luminescence at a low energy are combined, Energy Characteristic a will present somewhat a mountain shape at 100 keV or so, and will come to fall under the energy of 100 keV. In order to compensate distortions left behind on the energy characteristic, a pre energy compensation low range dose rate D1 is multiplied by an energy compensation coefficient β1 to make a low range compensation dose rate DL of the post energy compensation. Accordingly, a good characteristic like Energy Characteristic b will be obtained.

Figure 9:
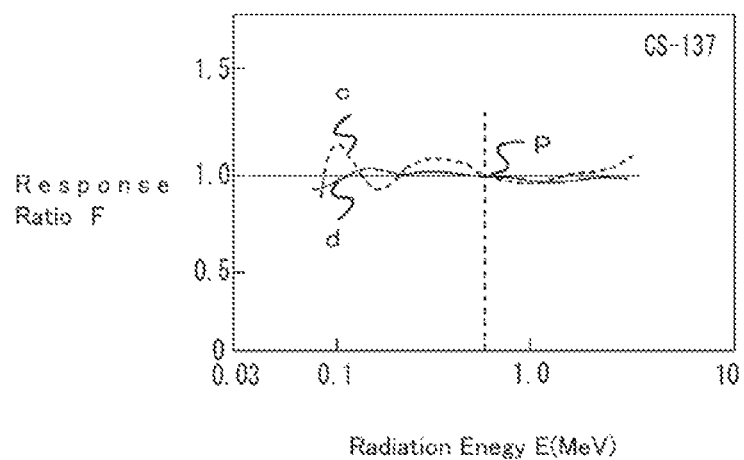
FIG. 9 is a drawing for showing an energy characteristic of the high range dose rate.

FIG. 9 illustrates the energy characteristics of high range dose rates before and after the energy compensation. Energy Characteristic c shows the energy characteristic of a pre energy compensation high range dose rate D2. Energy Characteristic d shows the energy characteristic of a high range compensation dose rate DH, which is the result of multiplying a pre energy compensation high range dose rate D2 by an energy compensation coefficient β2. Physical filters 222a, 222b, and 222c are installed so as to contain respective PL scintillation fibers 221a, 221b, and 221c inside thereof. Although sensitivity per dose rate or counting rates can be made almost flat by the action of the physical filters, the energy characteristic presents somewhat a mountain shape at the low energy of 100 keV or less.

It is to be noted that the energy characteristic presents somewhat a valley shape which is produced between 100 keV and 200 keV, and further a rapid decrease below 60 keV, as a result of discarding and not measuring the detector signal pulses of less than 50 keV in the A-D conversion part 322, in order to remove the influence of noises. In order to compensate distortions left behind on the energy characteristic, a pre energy compensation high range dose rate D2 is multiplied by an energy compensation coefficient β2 to make a high range compensation dose rate DH of the post energy compensation. Accordingly, a good characteristic like Energy Characteristic d will be obtained.

When the dose rate becomes high, the first radiation detector 21 and the second radiation detector 22 produce a detection signal pulse with a shorter interval, and at a further high dose rate, dose rates will fall, owing to the influence of the pileup probability of a detector pulse signal. At the same dose rate, the number of analog voltage pulses per unit time outputted from the first radiation detector 21 (a scintillation detector) decreases as the energy of the incident radioactive ray becomes large, and the saturation by the pileup is shifted to a higher dose rate side. Then, the physical filters 222a, 222b, and 222c are provided so that the PL scintillation fibers 221a, 221b, and 221c may be covered. When no filter 222 is provided, energy characteristics have a tendency in which the counting rate of a detection signal pulse corresponding to a dose rate increases exponentially as energy becomes a lower energy level. The physical filters can control in general the energy characteristics evenly and the pileup of the detection signal pulse at low energy level can be restrained.

Figure 10:
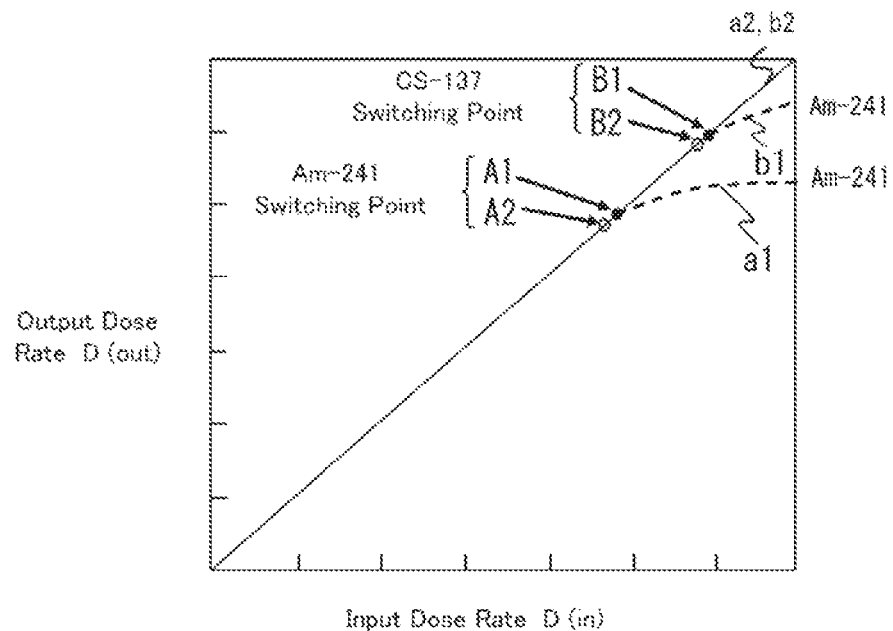
FIG. 10 is a drawing for showing the take-over in the range by the dose rate switching.

FIG. 10 illustrates the role of a switching operation point in the dose rate switching part 33. The horizontal axis indicates the input dose rate D (in) of an incident radioactive ray, and the vertical axis indicates the output dose rates D (out) of the low range dose rate operation part 3133 and the high range dose rate operation part 3232. The horizontal axis and the vertical axis are both expressed in the log scale. The input and output response characteristic a1 shows notionally a characteristic of the low range dose rate measurement part 31 to an effective energy 57 keV of Am (Americium)-241. The low range compensation dose rate DL increases, as shown by a solid line, in proportion to the input dose rate D (in), and is saturated, like a dotted line following it. Similarly, the input and output response characteristic a2 shows notionally a characteristic of the low range dose rate measurement part 31 to an effective energy 660 keV of Cs (Cesium)-137. The input and output response characteristic a2 overlaps mostly with the input and output response characteristic a1, changes like a solid line, and is saturated like a dotted line at the place where the dose rate is higher than the input and output response characteristic a1.

The input and output response characteristic b1 shows notionally a characteristic on Am-241 of the high range dose rate measurement part 32. Near the switching point of fluctuations, a center value overlaps mostly with the input and output response characteristic a1. The saturation shifts 4 decades or more from the input and output response characteristic a1 to the high range dose rate side, and the characteristic does not saturate within a measurement range. Similarly, the input and output response characteristic b2 shows notionally a characteristic on Cs-137 of the high range dose rate measurement part 32. The center value of fluctuations overlaps mostly with the input and output response characteristic a2, and the saturation has shifted 4 decades or more from the input and output response characteristic a2 to the high dose rate side. The characteristic does not saturate within a measurement range, and the input and output response characteristic b1 and the input and output response characteristic b2 overlap mostly within a measurement range.

The solid lined overlap of the input and output response characteristic a1 and the input and output response characteristic b1 shows an ideal case, where the low range compensation dose rate DL has perfect linearity, and energy characteristic is compensated completely and evenly. Similarly, the solid lined overlap of the input and output response characteristic a2 and the input and output response characteristic b2 shows an ideal case, where the high range compensation dose rate DH has a perfect linearity, and the energy characteristic is compensated completely and evenly. The overlap of the input and output response characteristics a1, a2, b1, and b2 near a switching point shows an ideal case, where there is no vessel difference in the dose rate measurement, and the energy characteristics of the low range compensation dose rate DL and the high range compensation dose rate DH overlap completely.

In reality, some deviations are generated with respect to an ideal overlap, because some distortions remain after the energy compensation is carried out or so (refer to FIG. 8 and FIG. 9). It is to be noted that the actual switching between the low range compensation dose rate DL and the high range compensation dose rate DH is performed under the existence of fluctuations in each dose rate, even in the ideal situation where the center value of the fluctuation of the high range compensation dose rate DH overlaps with the low range compensation dose rate DL. Therefore, some difference in level occurs at the time of the switching between the low range compensation dose rate DL and the high range compensation dose rate DH.

The dose rate switching part 33 receives a low range compensation dose rate DL outputted from the low range dose rate operation part 3133 and a high range compensation dose rate DH outputted from the high range dose rate operation part 3232, and calculates a dose rate ratio (the high range compensation dose rate DH/the low range compensation dose rate DL). At the time of an upward switching, the measurement range is switched from the low range compensation dose rate DL to the high range compensation dose rate DH, when the dose rate ratio (DH/DL) becomes larger than 1+k1. It is to be noted that at the time of a downward switching, the measurement range will be switched from a high range compensation dose rate DH to a low range compensation dose rate DL, when the dose rate ratio (DH/DL) becomes less than 1+k2. Hereafter, the constant k1 and the constant k2 are taken as positive. As a result, the display and operation part will switch a display range from a low range to a high range, when the dose rate ratio exceeds 1+k1, and will switch a display range from a high range to a low range, when the dose rate ratio falls down to 1+k2.

The upward switching point A1 and the downward switching point A2 on Am-241, and the upward switching point B1 and the downward switching point B2 on Cs-137 are shown in the drawing. It is assumed to be k1>k2, so that hunching by fluctuations at the time of switching operation may be prevented, and k1 and k2 are set to suitable values calculated in the experiment so that the difference in level accompanied by a switching might be minimized. The constant k1 and the constant k2 are selected to be positive numbers, and further the saturation of the low range compensation dose rate DL is detected and switching to the high range compensation dose rate DH is carried out. Accordingly, it is possible to ensure the switching also at the time of a rapid upward response.

As mentioned above, the low range dose rate measurement part 31 and the high range dose rate measurement part 32 respectively measure a wave height spectrum, calculate a moving average wave height, and compensate the energy characteristics of the each low energy region based on the moving average wave height. Thereby, preferred energy characteristics can be obtained over the whole measurement energy. The low range dose rate measurement part 31 and the high range dose rate measurement part 32 measure each assigned dose rate, in other words, the low range compensation dose rate DL and the high range compensation dose rate DH, on the basis of the preferred energy characteristics. The dose rate switching part 33 determines a suitable switching point automatically according to the energy of an incident radioactive ray, based on the dose rate ratio (DH/DL) and performs switching between the low range compensation dose rate DL and the high range compensation dose rate DH. Accordingly, a precise dose rate monitoring device which is highly good in energy characteristic and linearity over the whole measurement ranges can be offered.

Furthermore, PL scintillation fibers 221a, 221b, and 221c of the second radiation detector 22 are arranged with an equal interval around the central axis of the first radiation detector, so that an opened one end side of each PL scintillation fiber may turn its face obliquely upward. Accordingly, the PL scintillation fibers 221 are arranged in a position of not becoming an obstacle to the measurement space of the inorganic crystal scintillator 211 of the first radiation detector. It is to be noted that the PL scintillation fibers are arranged so that the total effective areas viewed from the ceiling direction and the total effective area viewed from a linear direction which crosses at a right angle with the central axis of the first radiation detector may become substantially equal. As a result, the first radiation detector 21 and the second radiation detector 22 do not become an obstacle to the measurement mutually, and good direction dependency can be obtained in the measurement space.

The dose rate monitoring device is configured to take the combination of an inorganic crystal scintillator and a fiber like plastic scintillator, where the inorganic crystal scintillator is employed to the first radiation detector that is in charge of the low range dose rate range and the fiber like plastic scintillator is employed to the second radiation detector that is in charge of the high range dose rate range. The second radiation detector is arranged around the central axis of the first radiation detector, not to become a shadow of the measurement area, and further shares the measurement area of the first radiation detector. The second radiation detector is arranged so as to be symmetry with and equiangular to the central axis, in order that the sensitivity at the time when radioactive rays are irradiated from a central axis of the first radiation detector and the sensitivity at the time when radioactive rays are irradiated from a direction which is at a right angle with the central axis may become equivalent. As a result, the desired measurement range can be easily realized not only compactly, but also in the form where the direction dependency is restrained, due to both the differences of a sensitivity difference per unit capacity and a capacity difference in two detectors.

The first dose rate measurement means measures a wave height of the first detection signal pulse, generates a first wave height spectrum based on the wave height, and finds a first dose rate based on the relation between the wave height of the first wave height spectrum and the dose rate per unit counting rate. The second dose rate measurement means measures a wave height of the second detection signal pulse, generates a second wave height spectrum based on the wave height, finds a counting rate based on the second wave height spectrum, converts the counting rate into a dose rate, and obtains a second dose rate.

The first energy compensation coefficient operation means and the second energy compensation coefficient operation means calculate an average wave height based on the respective spectrum of the low range dose rate range and the high range dose rate range, and correct distortions of the energy characteristics peculiar to a radiation detector based on an average wave height. Thereby, good energy characteristics are obtained over the whole ranges. Accordingly, the level difference due to the dose rate switching can be controlled to the minimum level, when switching is carried out between a low dose rate range and a high dose rate range to output one of them. In addition, a dose rate monitoring device which is good in measurement accuracy over the whole measurement range can be offered.

Embodiment 2.

Figure 11:
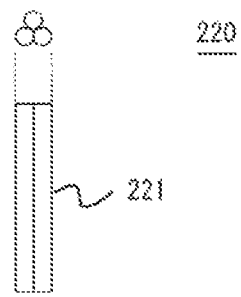
FIG. 11 is a drawing for showing the structure of a PL scintillation fiber bundle in accordance with Embodiment 2.

In the dose rate monitoring device according to Embodiment 2, the configuration of PL scintillation fibers is shown in FIG. 11. In Embodiment 1, the PL scintillation fibers 221a, 221b, and 221c of the second radiation detector 22 are made from a single plastic scintillation fiber. In Embodiment 2, the PL scintillation fiber 221 is constituted from a fiber bundle 220 which bundles two or more plastic scintillation fibers (for example, 3 fibers). An effect can be realized that the PL scintillation fiber in Embodiment 2 can respond flexibly by using a fiber bundle, also when the substantial diameter of a scintillator needs to be enlarged in the range distribution.

Embodiment 3.

Figure 12:
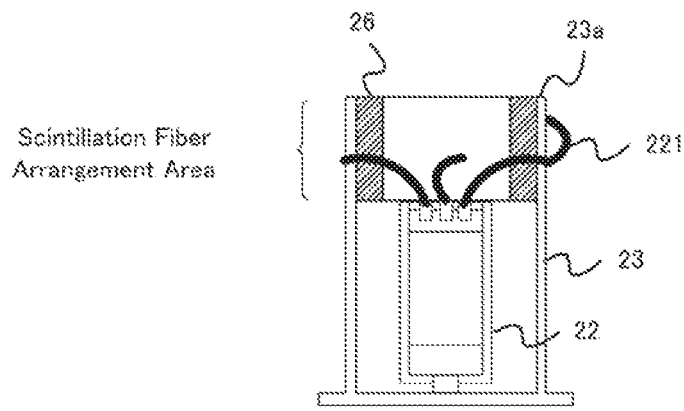
FIG. 12 is a sectional view for showing the principal part of a detecting part in accordance with Embodiment 3.

In the dose rate monitoring device according to Embodiment 3, the configuration of the detector mount 23 is shown in FIG. 12. At the scintillation fiber arrangement area of the detector mount 23, there is arranged a shield body 26 which shields radioactive rays. In the detector mount 23, the shield body 26 is arranged at the position which is located between the inside of PL scintillation fibers 221*a*-221*c* and the outside of the first radiation detector 21, and does not obstruct the measurement space of the first radiation detector 21. The shield body 26 is capable of shielding radioactive rays from the back side direction of the second radiation detector 22, and then the directional characteristics in the dose rate measurement can be further improved.

Embodiment 4.

Figure 13:
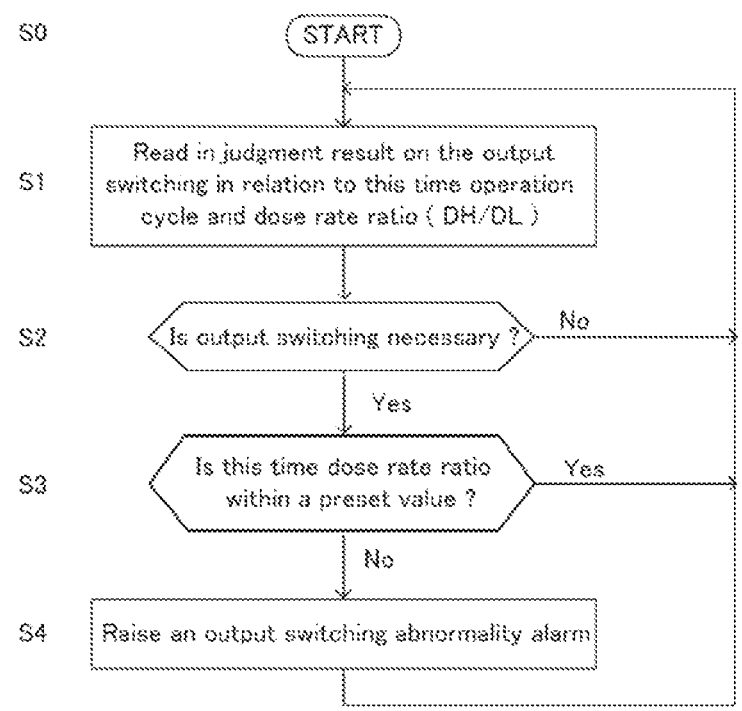
FIG. 13 is a drawing for showing the flow in the operational processing at the dose rate switching part in accordance with Embodiment 4.

In the dose rate monitoring device according to Embodiment 4, the operation processing flow is shown in FIG. 13. According to the present embodiment, the dose rate switching part 33 is configured to diagnose output switching based on a dose rate ratio (DH/DL), when the output of a dose rate is switched at this time operation cycle. The process starts at step S0 and the dose rate switching part 33 reads in a judgment result on the necessity of an output switching in relation to this time operation cycle and a dose rate ratio (DH/DL) at step S1, like in Embodiment 1. At step S2, the dose rate switching part 33 makes a judgement on the necessity of an output switching, and the process returns to step S1, if the answer is No.

If the answer on the necessity of an output switching is Yes, the dose rate switching part 33 makes a judgement at step S3, whether this time dose rate ratio (DH/DL) is within a preset value or not. If the judgment is Yes, the process returns to step S1. If the dose rate ratio (DH/DL) is larger than the preset value and the judgment is No, the dose rate switching part 33 raises an output switching abnormality alarm (abnormality alarm) to the display and operation part 34 at step S4, and then the process returns to step S1. As the display and operation part 34 is configured to display the output switching abnormality alarm based on the result of diagnosis, whether the range switching is performed normally or not can be self-diagnosed, and a more reliable dose rate monitoring device can be offered.

Figure 14:
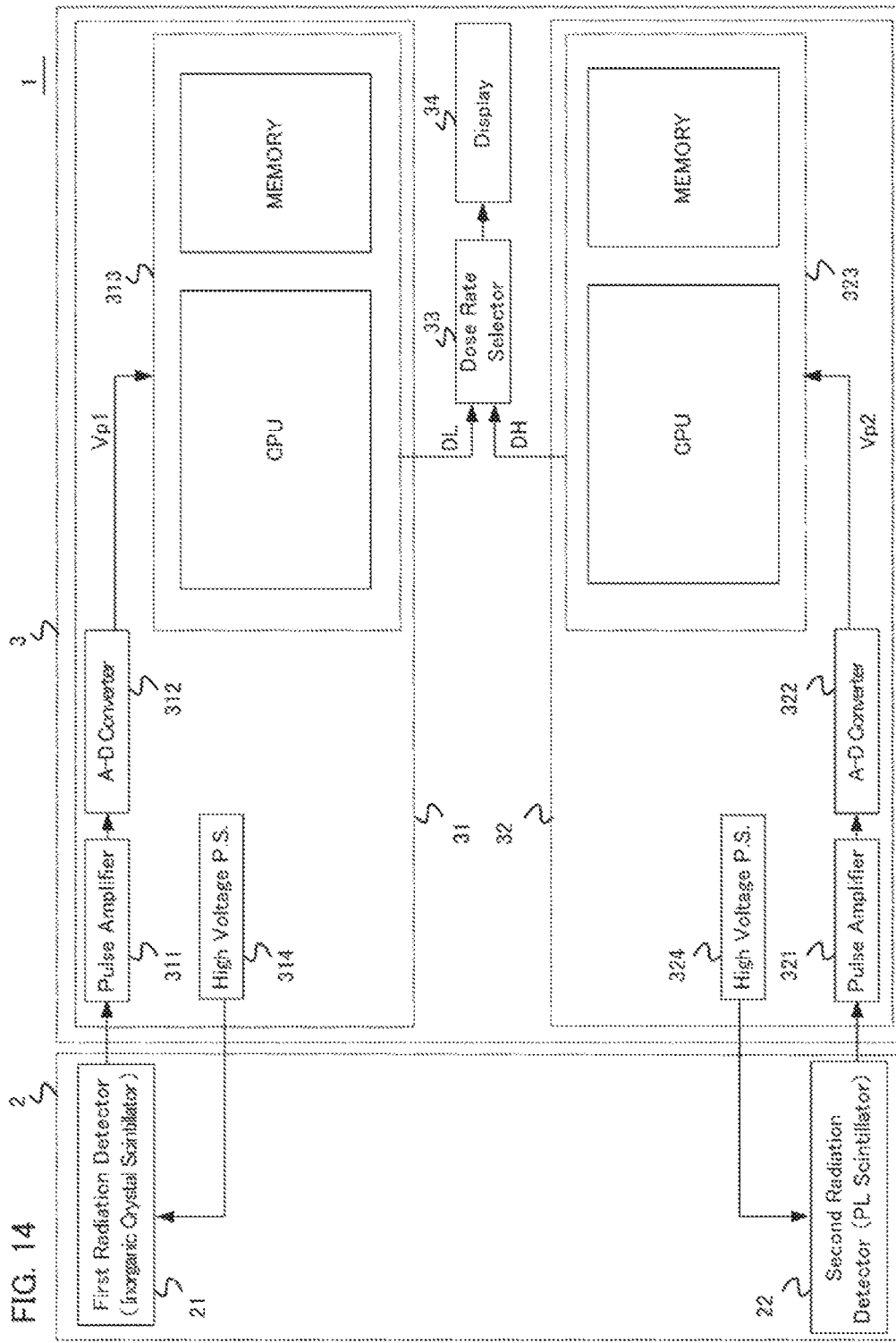
FIG. 14 is a drawing for showing the configuration of a dose rate monitoring device in accordance with Embodiments 1 to 4.

It should be noted that each embodiment of the present invention may be freely combined, or appropriately modified or omitted within the spirit and scope of the invention. FIG. 14 is a drawing for showing the configuration of a dose rate monitoring device in accordance with Embodiments 1 to 4. As shown in the drawing, the low range operation part 313 and the high range operation part 313 can be realized by a CPU (Central Processing Unit) and memory.

EXPLANATION OF NUMERALS AND SYMBOLS

1 Dose Rate Monitoring Device; 2 Detecting Part; 21 First Radiation Detector; 211 Inorganic Crystal Scintillator; 212 Photo-multiplier; 213 Preamplifier; 214 Detector Case; 22 Second Radiation Detector; 221*a*, 221B and 221C PL Scintillation Fiber; 222*a*, 222*b* and 222*c* Filter; 223*a* 223*b* and 223*c* Optical Coupler; 224*a*, 224*b* and 224*c* Optical Fiber; 225*a*, 225*b* and 225*c* Shading Tube; 226 Light Guide; 227 Photo-multiplier; 228 Preamplifier; 229 Detector Case; 220 Fiber Bundle; 23 Detector Mount; 24 Detecting Part Overcoat; 25 Stand; 26 Shield Body; 3 Measurement Part; 31 Low Range Dose Rate Measurement Part; 311 Pulse Amplifier; 312 A-D Conversion Part; 313 Low Range Operation Part; 3131 Wave Height Spectrum Generation Part; 3132 G (E) Function Memory; 3133 Low Range Dose Rate Operation Part; 3134 Energy Compensation Coefficient Operation Part; 314 High Voltage Power Supply; 32 High Range Dose Rate Measurement Part; 321 Pulse Amplifier; 322 A-D Conversion Part; 323 High Range Operation Part; 3231 Wave Height Spectrum Generation Part; 3232 High Range Dose Rate Operation Part; 3233 Energy Compensation Coefficient Operation Part; 324 High Voltage Power Supply; 33 Dose Rate Switching Part; 34 Display and Operation Part

What is claimed is:

1. A dose rate monitoring device comprising;
a first radiation detector, including an inorganic crystal scintillator and outputting a detection signal pulse when a radioactive ray enters,
a second radiation detector, including a plastic scintillator and outputting a detection signal pulse when a radioactive ray enters,
a detector mount, having a cylinder part and accommodating the first radiation detector and the second radiation detector,
a low range calculator, calculating a first compensation dose rate of an incident radioactive ray, using an energy compensation coefficient and a G (E) function table, based on the detection signal pulse which is outputted from the first radiation detector,
a high range calculator, calculating a second compensation dose rate of an incident radioactive ray, using an energy compensation coefficient, based on the detection signal pulse which is outputted from the second radiation detector,
a dose rate calculator, calculating a dose rate ratio from the first compensation dose rate which is calculated in the low range calculator and the second compensation dose rate which is calculated in the high range calculator, and choosing a compensation dose rate, which is to be outputted therefrom, according to the magnitude of the calculated dose rate ratio; and
a display, displaying the compensation dose rate which is outputted from the dose rate calculator,
wherein the plastic scintillator which is included in the second radiation detector is wound around the cylinder part of the detector mount.

2. The dose rate monitoring device according to claim 1, wherein the first radiation detector and the second radiation detector are arranged on a central axis of the detector mount.

3. The dose rate monitoring device according to claim 1, wherein the plastic scintillator is arranged towards the further back side direction than the bottom face of the inorganic crystal scintillator.

4. The dose rate monitoring device according to claim 1, wherein the dose rate calculator chooses the second compensation dose rate and outputs it, when the dose rate ratio exceeds 1+k1, and chooses the first compensation dose rate and outputs it, when the dose rate ratio falls down to 1+k2, on the assumption that constant k1>constant k2>0.

5. The dose rate monitoring device according to claim 1, wherein the plastic scintillator consists of a fiber bundle.

6. The dose rate monitoring device according to claim 1, wherein the detector mount includes a shield body against radioactive rays and is arranged inside the cylinder part.

7. The dose rate monitoring device according to claim 1; wherein the dose rate calculator raises an abnormality alarm when the dose rate ratio is larger than a preset value.

* * * * *